Aug. 14, 1934.  A. BECHLER  1,970,216
SCREW SLOTTING DEVICE
Filed Nov. 30, 1932   2 Sheets-Sheet 2

Inventor:
André Bechler
By [signature]
Attorney

Patented Aug. 14, 1934

1,970,216

UNITED STATES PATENT OFFICE 1,970,216

SCREW SLOTTING DEVICE

André Bechler, Moutier, Switzerland

Application November 30, 1932, Serial No. 645,098
In Switzerland September 24, 1932

1 Claim. (Cl. 29—51)

The present invention relates to a screw slotting device combined with an automatic lathe.

In the automatic lathes with a slidable head stock the screw slotting device is mounted sometimes on the bottom slip of the lathe reserved for the accessory apparatus and is driven by cams mounted on the camshaft arranged alongside of the lathe. In other machines the conveyor-arm of the screws is made sometimes to oscillate on a pivot pin held in a bearing of the tool slide.

These two arrangements present some disadvantage. The first arrangement causes much encumberment by preventing the simultaneous use of certain accessory mechanisms and by the second arrangement a place is occupied where it would be preferable to place a further tool.

The object of the present invention is a screw slotting device for automatic lathes having four tools positioned in a fan-like arrangement around the axis of the lathe. This device is characterized in that the conveyor-arm is rigidly fast to a shaft held by the tool slide inside the angle formed by the two vertical tools. By this arrangement it is possible to place the drive at one end of the lathe by supporting the shaft in a special bracket provided at the end of the lathe.

In the accompanying drawings one working form of the invention is shown as an example.

Figure 1:
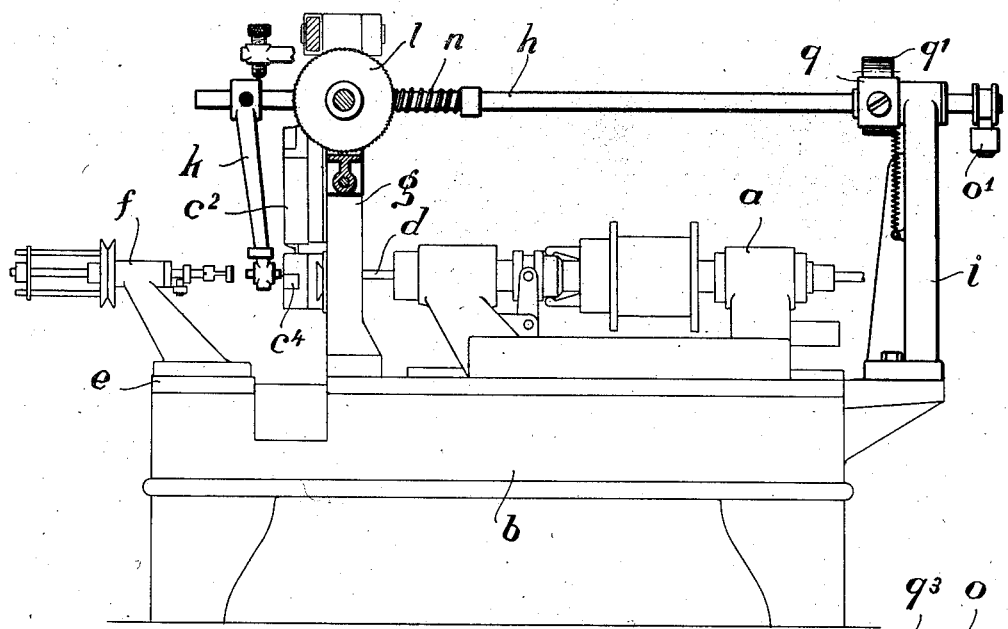
Figure 1 is a side view of a lathe to which the device according to the present invention has been adapted.
Figure 2:
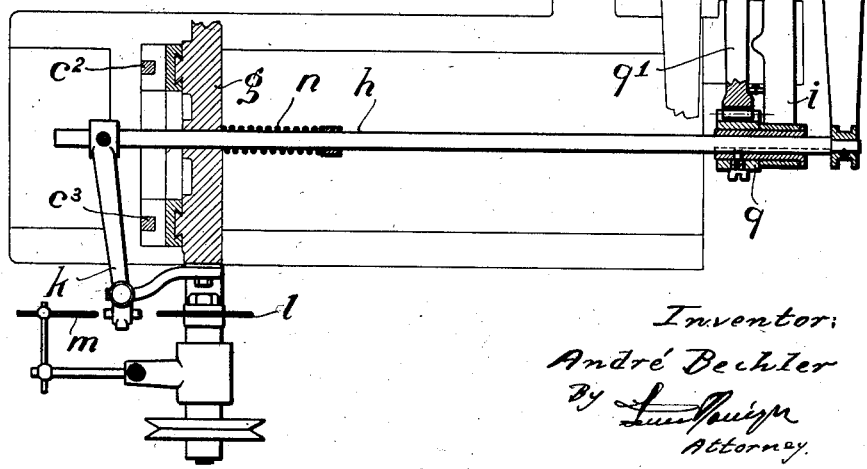
Fig. 2 is a plan view.
Figure 3:
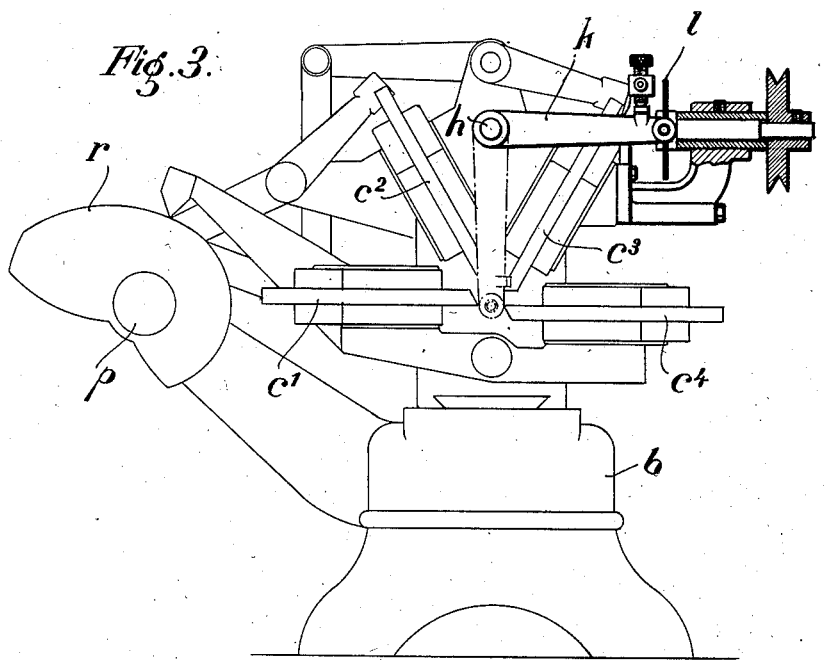
Fig. 3 is an end view from the side of the accessory device.
Figure 4:
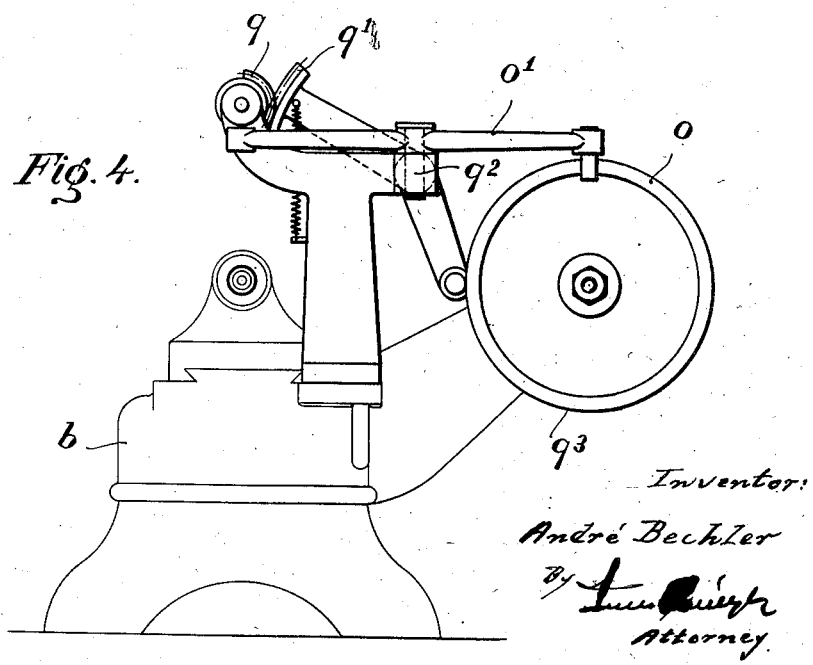
Fig. 4 is an end view from the side of the tool drive.

The slidable head stock $a$ of the lathe moves on the bed $b$ to bring the rod $d$ from which the screws have to be made within reach of the horizontal tools $c^1$ and $c^4$ and the vertical tools $c^2$ and $c^3$. A screwing chuck $f$ is mounted on the bottom bed $e$ for cutting the thread of each screw.

A shaft $h$ adapted to rock in an axial sense is supported by a standard $g$ on which are slidably mounted the vertical tools $c^2$ and $c^3$ within the angular space enclosed by said tools. This shaft extends to the end of the lathe where it is supported by a special standard $i$. This shaft carries at the end where the tools are located a conveying arm $k$. This arm is constructed as usual and can move parallel with the axis of the lathe and can oscillate around the shaft $h$. By the first movement the threaded screw is seized and by the oscillatory movement the screw is brought into the face of the cutter $l$ and a further longitudinal movement in an opposite direction to the first brings the screw in contact with an ejector $m$ by which the finished screw is dropped into a receptacle. These different movements in an axial sense are imparted to the shaft $h$ against the effect of a spring $n$ by means of a cup-shaped cam $o$ mounted on the end of the cam shaft $p$ and controlling by means of a lever $o^1$ the end of shaft $h$. This shaft carries besides a toothed segment $q$ meshing with a segmental lever $q^1$ pivotably held on lugs $q^2$. The end of the free arm of said segmental lever contacts with a cam $q^3$ so that the bosses of said cam impart an oscillatory movement to said lever which movement is transmitted to the conveying arm $k$ by means of the segment $q$ fast to the shaft $h$.

This arrangement leaves the bottom bed $e$ free for any other tools and does not obstruct the cam shaft $p$ in the neighborhood of the standard $g$ where ordinarily there is very little room left for other members than the different cams such as $r$ for working the tilting member and the different turning tools.

In this arrangement the fact that the drive of the slotting device is located at the end of the cam shaft facilitates greatly the arranging and adjusting of parts.

What I claim is:

In an automatic lathe having a bottom bed, a standard mounted on the bottom bed, four turning tools carried by said standard and positioned thereon in a fan-like arrangement about the turning axis of said lathe, a threading device coaxially arranged opposite the turning tools, said standard having a lateral extension, a screw slotting device mounted on said extension, a screw ejecting device mounted on said extension adjacent said slotting device, a second standard mounted on said bottom bed and spaced from the first standard, a shaft slidably and rockably supported by said standards and positioned directly above the axis of the lathe, a screw carrying arm affixed to said shaft, means for rocking said shaft to move a screw held by said arm to the slotting device, and cam means for sliding said shaft to move the screw into engagement with the slotting device and to a position to engage said ejecting device to remove the screw from said carrying arm.

ANDRÉ BECHLER.